United States Patent [19]

Arahara et al.

[11] Patent Number: 4,745,030

[45] Date of Patent: May 17, 1988

[54] ELECTROSTATIC RECORDING DEVICE

[75] Inventors: Kozo Arahara; Tatsuo Takeuchi, both of Tokyo; Yoshio Takasu, Tama, all of Japan

[73] Assignee: Canon Kabushiki Kaisha, Tokyo, Japan

[21] Appl. No.: 785,616

[22] Filed: Oct. 9, 1985

[30] Foreign Application Priority Data

| | | | |
|---|---|---|---|
| Oct. 15, 1984 | [JP] | Japan | 59-215677 |
| Dec. 19, 1984 | [JP] | Japan | 59-266415 |
| Dec. 19, 1984 | [JP] | Japan | 59-266418 |
| Dec. 19, 1984 | [JP] | Japan | 59-266419 |

[51] Int. Cl.[4] .......................... B32B 27/30; B32B 15/08

[52] U.S. Cl. .................................. 428/421; 346/135.1; 428/422; 428/461

[58] Field of Search .................. 430/63; 428/421, 457, 428/474.7, 461, 422; 427/261; 346/135.1

[56] References Cited

U.S. PATENT DOCUMENTS

| | | | |
|---|---|---|---|
| 4,081,583 | 3/1978 | Akiyama et al. | 428/461 X |
| 4,377,629 | 3/1983 | Tarumi et al. | 430/63 X |

*Primary Examiner*—Thomas J. Herbert

*Attorney, Agent, or Firm*—Fitzpatrick, Cella, Harper & Scinto

[57] ABSTRACT

An electrostatic recording device of transfer system provided with a recording medium having a dielectric layer and an electroconductive substrate is disclosed in which the recording medium has a dielectric layer containing a fluorine-containing block copolymer.

21 Claims, 2 Drawing Sheets

ELECTROSTATIC RECORDING DEVICE

BACKGROUND OF THE INVENTION

1. Field of the Invention

This invention relates to an electrostatic recording device, particularly, to an electrostatic recording device of transfer system by use of an electrostatic recording medium which can be used for a plurality of times.

2. Description of the Prior Art

In the prior art, as the recording medium in an electrostatic recording device, an electrostatic recording paper having an electroconductive layer provided between a recording layer and base paper is generally employed, and a recorded image is obtained by forming an electrostatic latent image on the surface of the recording layer by means of a needle electrode such as multi-stylus and the like, followed by development with toner and fixing. However, when such an electrostatic recording paper is employed, attachment of excessive toner onto the surface of the recording paper cannot be avoided, and the recording is easy to be influenced extremely by the atmosphere (moisture, heat, etc.). Moreover, since the electrostatic recording paper itself is special as compared with plain paper, the use thereof as consumptive material leads to the disadvantage of markedly increased running cost.

Accordingly, there is also known a system in which a thin dielectric layer is provided on the surface of an electro-conductive rigid body cylinder, an electrostatic latent image is formed on the surface of the thin dielectric layer, the latent image is developed with toner and transferred and fixed on plain paper by pressure (e.g. Japanese Laid-open Patent application Nos. 78134/1979 and 134872/1980). According to this system, the thin dielectric layer is scraped with paper and therefore its surface is abraded. Thus, from the standpoint of increasing the hardness of the dielectric layer, inorganic dielectric materials such as anodized aluminum, $Al_2O_3$ by a flame spraying, glass enamel and the like, or organic dielectric materials such as polyamide, polyimide and the like have been employed. However, an inorganic dielectric layer composed of the inorganic materials such as anodized aluminum, flame spraying $Al_2O_3$, glass enamel and the like will bring about marked lowering in surface resistance through attachment of the moisture in the atmosphere, whereby no stable and good image can constantly be obtained.

On the other hand, an organic dielectric recording layer composed of a polyimide, polyamide, fluorine type resin or the like may be said to be relatively free from suffering from dependency of its electrical characteristics on environment of temperature and humidity. However, since an organic layer is insufficient in abrasion resistance, under the present situation, no sufficient durability can be obtained for such problems of cutting or scraping damage of the surface by the cleaner, when applied for an electrostatic recording device of transfer system. Particularly, when performing the step of pressure transfer simultaneously with fixing, scraping marks with transfer paper are also added to make the organic recording layer further difficultly available. Besides, these organic recording layers suffer from oxidation by ozone under high electrical field for prolonged use. Thus, sooner or later, humidity characteristics will be worsened.

Generally speaking, polyimide type or polyamide type resins are relatively great in hardness but weak to impact, and flaws in shape of cracks will be readily formed, from where cutting occurs. Also, the pressure transfer system tends to be lower in transfer efficiency as 80% or lower, due to great surface energy. A fluorine type resin is satisfactory in transfer efficiency, but since it is so soft, scraped flaws tend to be readily formed.

Also, highly insulating resins employed generally for the dielectric layer are oxidized by ozone generated from the ion generator or the like used during formation of electrostatic latent images, whereby polar groups are introduced into its surface and there is involved the problem that electrostatic latent images corresponding to signals can no longer be formed after repeated uses.

On the other hand, in the case of pressure transfer system, triboelectric charge are induced on the dielectric layer surface through contact between the dielectric layer surface with plain paper and pressure rollers under pressurization. The polarity and amount of charges induced at this time may differ depending on the material of the pressure contact members such as the components of the transfer material and the resin components of the pressure rollers, the surface roughness of the pressure contact member, and further the temperature and humidity under use environment. For this reason, if triboelectric charging with markedly higher potential than the potential of electrostatic latent images or triboelectric charging of the polarity opposite to that of electrostatic images has occurred, it becomes difficult to effect uniform deelectrification. Also, unnecessary triboelectric charging on the dielectric surface will promote attachment of discharged products or charged fine powder such as paper powder and the like, to have bad influence on the image by lowering in surface resistance which is caused by moisture absorption of such attached matters. Further, when the distribution of triboelectric charges on the dielectric layer surface is nonuniform, ion injection during formation of electrostatic latent images may be impaired to cause bad influences such as unfocused image, blank areas and the like.

SUMMARY OF THE INVENTION

An object of the present invention is to provide an electrostatic recording device capable of forming a clear image even in a highly humid atmosphere.

Another object of the present invention is to provide an electrostatic recording device which is high in transfer efficiency.

A further object of the present invention is to provide an electrostatic recording device which can be used continuously for a long term without attachment of organic components in the developer and with good abrasion resistance, and is capable of performing recording of high image quality.

Still another object of the present invention is to provide an electrostatic recording device which can prevent bad influence on images by triboelectric charging, and can provide images of good quality for a long term.

More specifically, the present inventors have made studies in view of the points as mentioned above, and it has now been found that by incorporating a fluorine-containing block copolymer in the resin for film formation when forming the dielectric layer constituting the recording medium as described above.

(1) it is possible to obtain a dielectric layer which is high in transfer efficiency of the developer, difficult in attachment of the organic components in the developer and also good in abrasion resistance by improvement of water repellency, mold release property, non-tackiness and lubricity as well as improvement of adhesive force of the dielectric layer onto an electroconductive substrate without lowering hardness of the dielectric layer, (2) it is possible to prevent the dielectric layer surface from oxidation by ozone generated during actuation of the ion generator used during formation of the electrostatic latent image, whereby worsening of electrical characteristics during repeated use can be prevented, and (3) it has been rendered possible to suppress changes in image quality with the changes in environment such as humidity, and the like.

Thus, in accordance with the present invention, there is provided an electrostatic recording device of transfer system provided with a recording medium having a dielectric layer and an electroconductive substrate, said recording medium having a dielectric layer containing a fluorine-containing block copolymer.

DESCRIPTION OF PREFERRED EMBODIMENTS

Figure 1:
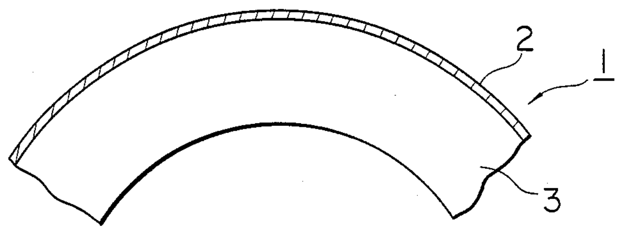
FIG. 1 is a schematic partial sectional view of the recording medium to be used in the present invention.

According to a preferred embodiment of the present invention, the above dielectric layer should preferably be one containing a resin for film formation having a pencil hardness of H or more after film formation (as measured by the "Pencil scratching test method" according to the Japanese Industrial Standard JIS K5401 and S6006) and a volume resistivity of $10^{13}\Omega$. cm or higher and a fluorine-containing block copolymer. In such an embodiment, the fluorine-containing block copolymer is contained in the above dielectric layer in an amount of 0.5 to 30% by weight, preferably 1 to 10% by weight. The amount of the fluorine-containing block copolymer added should preferably be 0.1% by weight or more with respect to the effects of water repellency and mold release, and also 50% by weight or less with respect to the impact resistance of the coated film.

The fluorine-containing block copolymer to be used in the present invention has a functional segment having surface migratability and a compatible segment which is compatible with the resin for film formation as described above. A preferably fluorine-containing block copolymer is an A-B type block copolymer having a polymer having fluorine-containing monomer component (e.g. fluorine-containing alkyl groups as described below) acting as the functional segment block-copolymerized at one end of the non-fluorine-containing polymer which acts as the compatible segment. As the fluorine-containing monomer component acting as the functional segment, there may preferably be employed those having fluoroalkyl groups such as $—CH_2(CH_2)_2H$, $—CH_2(CF_2)_4H$, $—CH_2CF_3$, $—CH_2CH_2(CF_2)_7CF_3$, $—CF_3$, $—C_2F_6$ and the like. On the other hand, as the polymer acting as the compatible segment, those containing vinyl monomer components are preferred, including specifically polymethyl methacrylate, polybutyl methacrylate, polymethyl acrylate, polyethyl acrylate or the like.

The A-B type fluorine-containing block copolymer is compatible through its compatible segment with the resin for film formation to enable improvement of adhesive force between the coated film and the substrate and improvement of hardness. Further, the fluoroalkyl groups acting as the functional segment will be migrated to the surface, whereby water repellency, mold release property, non-tackiness and lubricity of the coated film surface can be improved. These points cannot be attained when employing a random polymer of the same composition, as clarified in the Comparative example shown below.

These fluorine-containing block copolymers can be synthesized by use of a polymeric peroxide as the polymerization initiator [The 33th Annual Meeting of Society of Polymer Science, Preliminary Text, Page 266 (Vol. 33, No. 2, 1984)]. As the fluorine-containing block copolymer, Mobiper F100, F110, F200, F210, produced by Nippon Yushi K.K. may be available.

The present invention is described by referring to the drawings.

FIG. 1 shows a dielectric drum 1 for recording medium having a dielectric layer 2 as a recording layer provided on an electroconductive substrate 3.

Here, the shape of the recording medium is not limited to the drum shape as shown in FIG. 1, but it may also be shaped into a belt or a flat plate.

The electroconduotive substrate 3 is selected from aluminum, aluminum alloys, stainless steel and other metals, and it should preferably have a thickness to the extent which will not be deformed by pressurization during pressure transfer or pressure transfer simultaneously with fixing. Also, for hardening the surface of the electroconductive substrate or for improving the adhesive force of the dielectric layer to be coated by enlargement of the surface area of the electroconductive substrate, for example, anodic oxidation may be applied to the aluminum alloy surface, or hard chromium plating may be applied to the stainless steel surface.

Next, the dielectric layer 2 is a film formed directly or through another dielectric layer on the electroconductive substrate, said film comprising a mixture of 100 parts by weight of a resin for film formation having a pencil hardness of H or more after film formation and a volume resistivity of $10^{13}$ Ω.cm or higher and 0.1 to 50 parts by weight, preferably 1 to 10 parts by weight of a fluorine-containing block copolymer.

Here, the resin for film formation should preferably have a pencil hardness characteristic after film formation of H or more, more preferably 3H or more, in view of improvement of abrasion resistance, and a volume resistivity of $10^{13}\Omega$.cm or higher, more preferably $10^{15}\Omega$.cm or higher, in view of good images to be obtained.

The resin for film formation constituting the dielectric layer should adequately have a surface resistance after film formation of $10^{12}\Omega$ or higher, preferably $10^{13}\Omega$ or higher, in view of stable electrostatic latent images to be obtained.

Specific examples of the resin for film formation to be used may include polyimide, polyamideimide, polyamide, polyesterimide, polyester, polyvinylformal, epoxy resin, polyurethane, melamine resin, acrylic resin, polymethyl methacrylate, polyacrylamide, silicone resin, siliconepolyimide resin, siliconeepoxy resin, siliconeester resin, imideepoxyresin, urethaneacrylate resin, epoxyacrylate resin, phenol resin, polyacetal resin, fluorine resin, etc.

Also, by incorporating, if necessary, inorganic fine powder having a resistivity less than $10^{10}\Omega$.cm in the dielectric layer, the influence of triboelectric charging on the dielectric layer surface during image formation can effectively be prevented.

The volume resistivity of the inorganic fine powder is less than $10^{10}\Omega$.cm, preferably $10^{7}\Omega$.cm or less. The mean particle size of inorganic fine powder should preferably be 10 μm or less, more preferably 5 μm or less. If the mean particle size is over 10 μm, the dispersibility of inorganic fine powder in the coated film tends to be lowered.

Such inorganic fine powder may include, for example, tin oxide type inorganic oxides such as $SnO_2$, $SnO_2$-$TiO_2$, $SnO_2$-$BaSO_4$, and the like; other metal oxides such as di-iron trioxide, tri-iron tetroxide, di-nickel trioxide, zinc oxide and others; non-oxidative inorganic compounds such as silicon carbide, polycarbon monofluoride, carbon black and the like; metal fine powder such as copper, zinc, aluminum, silicon, iron, cobalt, nickel, manganese, tungsten, tin, antimony and the like; inorganic fine powder which is itself of high resistance (volume resistivity of $10^{10}\Omega$.cm or higher) and applied with electroconductive treatment, such as silicon dioxide, activated clay, acidic clay, kaolin, alumina powder, zeolite, applied with electroless plating such as of gold, silver, copper, nickel, etc.

By use of inorganic fine powder having a volume resistivity less than $10^{10}\Omega$.cm as one component for forming the dielectric layer, stable electrostatic latent images can be obtained without extremely lowering the surface resistance value of the dielectric layer, and at the same time there is provided a dielectric layer which will not cause disturbance of the image through triboelectric charging with a plain paper which is transfer paper or pressure rollers.

Its amount to be added may be 0.1 to 300 parts by weight, preferably 1 to 100 parts by weight, based on 100 parts by weight of the resin for film formation. If the amount is less than 0.1 part by weight, the effect of suppressing triboelectric charging is not sufficient, while an amount in excess of 300 parts by weight will lower the adhesive force of the coated film to the substrate.

The mold release property, smoothness, transfer efficiency of transfer material and triboelectric charging have a subtle relationship, and good images can be stably obtained for a long time for the first time by use of a dielectric layer obtained by adding the lubricant as described above and fine powder having a volume resistivity less than $10^{10}\Omega$.cm to a resin for film formation having a volume resistivity of $10^{12}\Omega$.cm or higher.

On the other hand, when such inorganic fine powder of low resistivity is added, the amount of the fluorine-containing block copolymer should preferably be within the range of from 0.01 to 300 parts by weight per 100 parts by weight of the resin for film formation.

Also, in the dielectric layer, it is also effective to add a lubricant with a static frictional coefficient of 0.4 or less. If the static frictional coefficient is over 0.4, no improvement of lubricity and transfer efficiency of developer can be obtained. Such lubricants may include fluorine-containing compounds such as polytetrafluoroethylene, polycarbon monofluoride and the like, and polyethylene, nylon or the like.

In the dielectric layer, inorganic powder having a volume resistivity of $10^{10}\Omega$.cm or higher may also be added, if necessary. This component of inorganic fine powder should have a volume resistivity of $10^{10}\Omega$.cm or higher, preferably $10^{11}\Omega$.cm or higher, by which the volume resistivity of the dielectric layer as a whole can be increased to obtain stable electrostatic latent images. Further, its mean particle size should preferably be 10 μm or less, whereby dispersibility of the fine powder within the coated film can be good to give uniform coated film.

Such fine powder may include, for example, alumina, magnesium oxide, boron nitride, asbestos, silica, glass powder, natural mica, synthetic mica, barium titanate, magnesium titanate, zirconium titanate, zircon, beryllia, fluorinated mica in which OH of crystal water in the crystal of natural mica is substituted with fluorine, or mixture thereof.

The particle size distribution of inorganic fine powder may be uniform, or in state of particles with different particle sizes combined so that the dielectric layer may have a structure as dense as possible, or further those in shapes of scales or fibers may be available.

The inorganic fine powder may be mixed with the resin for film formation at a proportion of 100 parts by weight of the former and 5 to 300 parts by weight, preferably 20 to 200 parts by weight, of the latter. If the resin for film formation is less than 5 parts by weight, impact resistance of the dielectric layer will be lowered to give rise to deterioration of images under highly humid environment. On the other hand, if it is over 300 parts by weight, ozone resistance characteristic will be lowered, and further cutting or scratching damage on the surface of dielectric layer by a cleaner is liable to be formed, whereby no sufficient durability can be obtained.

In the case where the inorganic fine powder of high resistivity is added, the amount of the fluorine-containing block copolymer formulated may be 0.001 to 300 parts by weight, preferably 0.01 to 100 parts by weight, based on 100 parts by weight of the inorganic powder.

In the case where both of the inorganic fine powders of low resistivity and high resistivity are added, if the respective components are defined as follows:

(A) inorganic powder with a volume resistivity of $10^{10}\Omega$.cm or more;

(B) fluorine-containing block copolymer;

(C) inorganic powder with a volume resistivity less than $10^{10}\Omega$.cm;

(D) resin for film formation with a surface resistance after film formation of $10^{12}\Omega$.cm or higher, the above mixture should preferably comprise 100 parts by weight of the component (A), 0.001 to 300 parts by weight of the component (B), 0.1 to 100 parts by weight of the component (C) and 5 to 300 parts by weight of the component (D).

In the following, a preferred embodiment of the recording medium is to be described. In the case of a drum-shaped recording medium, a cylinder made of an electroconductive substrate such as aluminum, an aluminum alloy, stainless steel and the like is prepared. The thickness of the cylinder is required so as to stand the pressure during pressure transfer or pressure transfer simultaneously with fixing. If the case of aluminum or an aluminum alloy, it should desirably be 10 mm or more. Then, the surface of the above cylinder is coated directly or through another dielectric layer with a paint comprising the resin for film formation and the fluorine-containing block copolymer, optionally admixed with a solvent, a curing agent, etc., and dried to form a film thereon. The film thickness is required to be at least 3 μm for retaining electrical insulation, desirably 10 μm or more.

Figure 2:
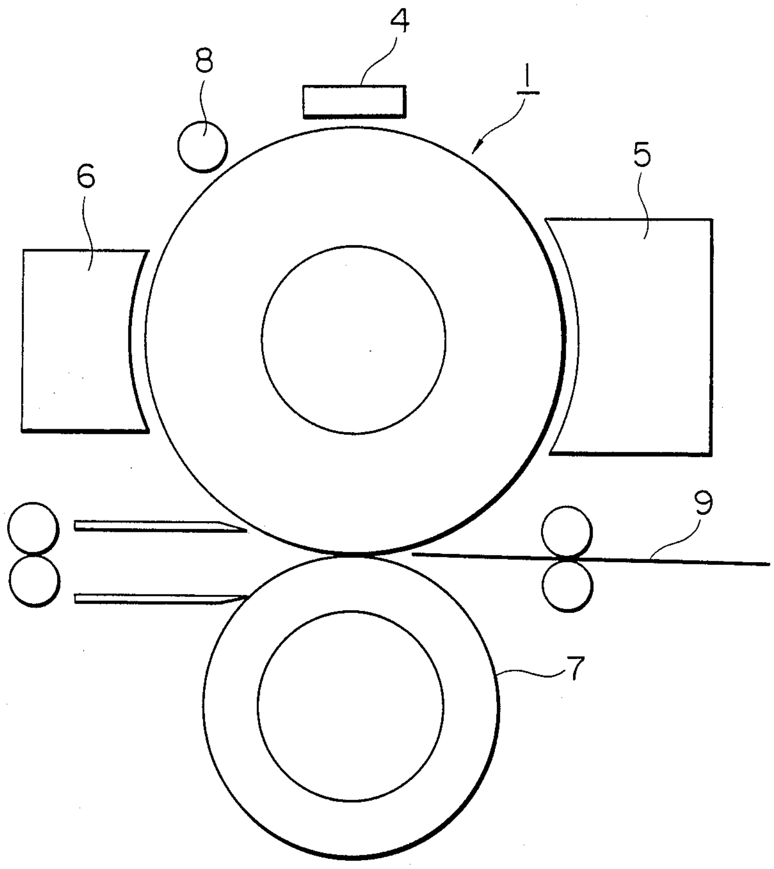
FIG. 2 is a schematic sectional view of the electrostatic recording device of the present invention.

Next, the dielectric drum as prepared above is assembled as the recording medium in an electrostatic recording device as shown in FIG. 2. To describe briefly about the constitution of the electrostatic recording device shown in FIG. 2, for formation of electrostatic latent images, a recording head 4 may be employed. As the system, either the multi-stylus as disclosed in Japanese Patent Publication No. 4119/1961 or the ion injection type as disclosed in Japanese Laid-open Patent Application No. 96834/1978 or No. 53537/1979 may be available. Basically, any system may be available, provided that electrostatic latent images can be formed on the surface of the dielectric body 2 in shape of dots. Desirably, a system in which no direct discharging is effected between the dielectric body 2 and the recording head 4, such as the latter ion injection type, should be used. The electrostatic latent image formed according to the above method is then made sensible at the developing section 5 and transferred under pressure by pressure rollers 7 on the plain paper 9. During this operation, by use of a pressure fixable toner, visible images can be transferred onto the plain paper and fixed at the same time.

Following then the conventional method, the recording medium after transfer of the visible image is deelectrified by a deelectrifier unit 8 and the residual toner after transfer is removed by the cleaner unit 6.

As the condition for pressure transfer simultaneous with fixing, a pressure of 20 $Kg/cm^2$ or higher should preferably be used for compression and fixing of the toner. As the toner to be employed, in addition to capsule toner, it is possible to use an externally added toner in which carbon and a magnetic material are externally added to resin particles such as of polyethylene, ethylene-vinyl acetate copolymer, polyamide, etc. or an internally added toner in which a magnetic material is internally added within resin particles such as of polyethylene, etc. Otherwise, charge controlling agent or abrasive may also be added to the externally added toner or the internally added toner.

Figure 3:
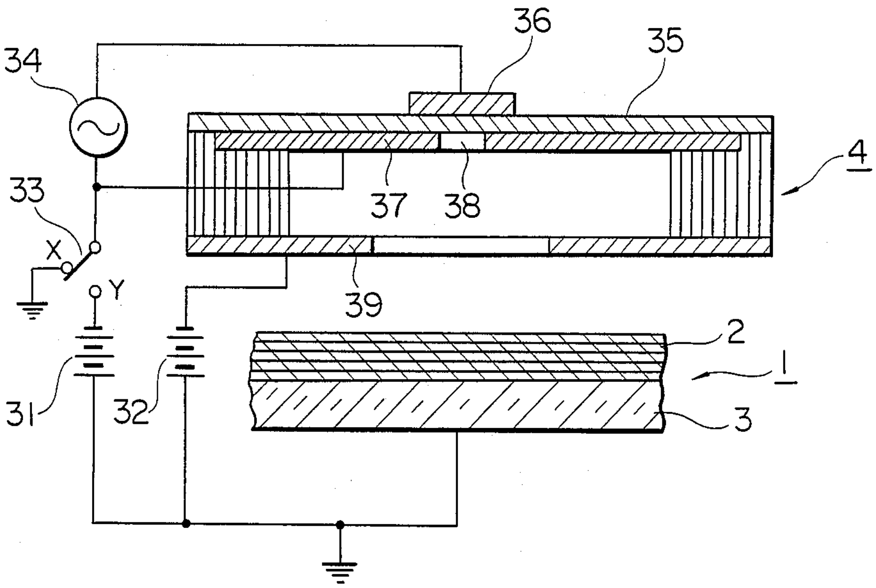
FIG. 3 is a schematic sectional view of the electrostatic latent image forming section in the electrostatic recording device of the present invention.

For recording electrostatic images corresponding to the image signals on the electrostatic image holding cylinder 1 in electrostatic recording head 4, it is possible to use an electrostatic recording head (ion generator) as disclosed in Japanese Laid-open Patent application No. 78134/1979. The electrostatic recording head 4, as shown in FIG. 3, comprises a dielectric member 35, a drive electrode 36, a control electrode 37 and a screen electrode having ion releasing aperture 38. Between the drive electrode 36 and the control electrode 37, an alternate current is applied by the power source 34, between the control electrode 37 and the electroconductive substrate 3 of electrostatic image holding cylinder 1, a direct current is applied from the power source 31 through the switch 33, and between the screen electrode 39 and the electroconductive substrate 3, a direct current is applied from the power source 32. By the alternate current applied between the drive electrode 36 and the control electrode 37, positive and negative ions are alternately generated. If the switch 33 is turned on (connected to the contact point Y) by the image signal, the negative ions will be accelerated to reach the dielectric layer 2 of the electrostatic image holding cylinder 1 to be held thereon. At this time, positive ions are not accelerated and therefore discharged between the control electrode 37 and the drive electrode 36. If there is no image signal and the switch 33 is turned off (connected to the contact point X), both positive and negative ions are not accelerated and therefore discharged between the control electrode 37 and the drive electrode 36. Thus, electrostatic latent images corresponding to image signals can be recorded.

As the method for forming the electrostatic latent image, it is also possible to use the method in which electrostatic latent images are formed by transferring the electrostatic images formed on the surface of an electrophotographic photosensitive member having a photoconductive layer to the dielectric layer as described above.

The present invention is described below by referring to Examples. In the following Examples and Comparative examples, pencil hardness was measured according to the "Pencil scratching test method" according to the Japanese Industrial Standard JIS K5401 and S6006.

On the other hand, the static frictional coefficient is a value when a body (lubricant) rests stationarily on the same material, as actually measured by TSS system frictional coefficient tester produced by Toyo Seiki.

EXAMPLE 1

A cyclized butadiene rubber paint JSR CBR-M (trase mark of Japan Synthetic Rubber K.K., containing 80 wt. % of xylene) was applied on the outer circumferential surface of a cylinder made of an aluminum alloy with an inner diameter of 60 mm, an outer diameter of 100 mm and a length of 230 mm, and dried by heating at 180° C. for 60 minutes to obtain a cylinder coated with a film with a thickness of 3 μm.

This cylinder was coated with a mixture of a paint prepared by adding and mixing 100 g of a UV-ray curable type epoxy acrylate paint Unidec V-5502 (trade mark of Dainippon Ink Chemical Industry K.K., resin content 100%), 8 g of a 25% MEK solution of benzophenone and 4 g of triethanolamine as the reaction accelerator with 5 g of Modiper F 200 (trade mark of Nippon Yushi K.K.) which is an A-B type block copolymer of a polymer having fluoroalkyl group and an acrylic polymer, dried at 80° C. for 10 minutes and then irradiated by a 4 KW condensing type UV-ray lamp at an irradiation distance of 15 cm for one minute to form a coating with a thickness of 20 μm, thus providing a cylinder coated with a film with a thickness of 23 μm as the sum with the cyclized butadiene rubber layer. The pencil hardness was found to be 5H and the volume resistivity $5.1 \times 10^{15}$ Ω.cm. By use of this cylinder, it was assembled in the electrostatic recording device as shown in FIG. 2, and image formation was performed with the use of an ion injection system recording head under the environments of 25° C., humidity 60%, and 35° C., humidity 90%. The results are shown in Table 1.

COMPARATIVE EXAMPLE 1

In the same manner as in Example 1 except for omitting the Modiper F200 (as described above) used in the paint for coating of the cylinder surface, a cylinder was prepared and image formation was performed. The results are shown in Table 1. The pencil hardness of the coated film was H and its volume resistivity was 4.7×10¹⁵Ω.cm.

EXAMPLE 2

A mixture of 100 g of an acrylic paint Duracron SE-5377 (trade mark of Mitsubishi Rayon K.K., resin content 50%) and 1.0 g of an A-B type block polymer of a polymer having fluoroalkyl group and an acrylic polymer, Modiper F100 (trade mark of Nippon Yushi K.K.), was applied on the same cylinder as used in Example 1 and dried by heating at 150° C. for one hour to obtain a cylinder coated with a film with a thickness of 15 μm. By use of the above cylinder, image formation was performed to obtain the results shown in Table 1. The pencil hardness was 5H, and the volume resistivity $7\times10^{15}$Ω.cm.

COMPARATIVE EXAMPLE 2

In the same manner as in Example 2 except for omitting the Modiper F100 (as described above) used in the paint for coating of the cylinder surface of Example 2, a cylinder was prepared and image formation was performed. The results are shown in Table 1. The pencil hardness of the coated film was 2H and its volume resistivity was $6.2\times10^{15}$Ω.cm.

COMPARATIVE EXAMPLE 3

In the same manner as in Example 2 except for omitting the Duracron SE-5377 (as described above) used in the paint for coating of the cylinder surface of Example 2, a cylinder with a coated film thickness of 14 μm was prepared and image formation was performed according to the same method as in Example 2. The results are shown in Table 1. The pencil hardness of the coated film was 2H and its volume resistivity was $1.1\times10^{14}$Ω.cm.

COMPARATIVE EXAMPLE 4

Except for using the same amount of polytetrafluoroethylene powder in place of Modiper F200 used in Example 1, a dielectric layer was formed according to entirely the same method to form a recording medium, and image formation was performed therefor. The results are shown in Table 1. The pencil hardness of the coated film was 5H and its volume resistivity $4.8\times10^{15}$Ω.cm.

COMPARATIVE EXAMPLE 5

Except for using the same amount of polytetrafluoroethylene powder in place of Modiper F100 used in Example 2, a dielectric layer was formed according to entirely the same method to form a recording medium, and image formation was performed therefor. The results are shown in Table 1. The pencil hardness of the coated film was 7H and its volume resistivity $6.4\times10^{15}$Ω.cm.

TABLE 1

| | Results of image formation | | | |
|---|---|---|---|---|
| | Initial stage | | After 100,000 sheets | |
| | 25° C., | 35° C., | After 100,000 sheets | |
| | Humidity 60% | Humidity 90% | 25° C., Humidity 60% | 35° C., Humidity 90% |
| Example 1 | Good | Good | Good | Good |
| Comparative example 1 | Good | Good | Image disturbed (Flaw and attachment of developing agent are prominent) | No image formed (Flaw and attachment of developing agent are prominent) |
| Example 2 | Good | Good | Good | Good |
| Comparative example 2 | Good | Good | Image disturbed (Flaw and attachment of developing agent are prominent) | No image formed (Flaw and attachment of developing agent are prominent) |
| Comparative example 3 | Image disturbed | Image disturbed | Image formation impossible (Film peeled off) | Image formation impossible (Film peeled off) |
| Comparative example 4 | Good | Good | Image disturbed (Flaw and attachment of developing agent are prominent) | No image formed (Flaw and attachment of developing agent are prominent) |
| Comparative example 5 | Good | Good | Image disturbed (Flaw and attachment of developing agent are prominent) | No image formed (Flaw and attachment of developing agent are prominent) |

(Note)
Cylinder surface condition is given in the bracket.

EXAMPLE 3

A cyclized butadiene rubber paint JSR CBR-M (trade name of Japan Synthetic Rubber K.K., containing 80 wt. % of xylene) was applied on the outer circumferential surface of a cylinder made of a aluminum alloy with an inner diameter of 60 mm, an outer diameter of 100 mm and a length of 230 mm, and dried by heating at 180° C. for 60 minutes to obtain a cylinder coated with a film with a thickness of 3 μm.

This cylinder was coated with a paint prepared by mixing the following components:

| | |
|---|---|
| UV-ray curable epoxy acrylate paint Unidec V 5502 (produced by Dainippon Ink Chemical Industry) (surface resistance after film formation: $8.0\times10^{15}$Ω) | 100 g |
| Tin oxide powder (mean particle size 0.1 μm, volume resistivity 1Ω · cm) | 10 g |
| Fluorine-containing block polymer Modiper F200 (produced by Nippon Yushi K.K.) | 5 g |
| 2-Ethylanthraquinone (photoreaction accelerator) | 2 g |
| Methyl ethyl ketone | 30 g, |

dried at 80° C. for 10 minutes and then irradiated by a 4 KW condensing type UV-ray lamp at an irradiation distance of 15 cm for one minute to form a coating with a thickness of 18 μm, thus providing a cylinder coated with a film with a thickness of 21 μm as the sum with the cyclized butadiene rubber layer. By use of this cylinder, it was assembled in the electrostatic recording device as shown in FIG. 2, and image formation was performed with the use of an ion injection system recording head and pressure rollers having the surface of polyacetal. The results are shown in Table 2.

COMPARATIVE EXAMPLE 6

Preparation of the cylinder and image formation were practiced in entirely the same manner as in Example 3 except for omitting Modiper F200 (as described above) used in the paint for coating of the cylinder surface of Example 3. [coated film thickness 21 μm (including the lower layer of 3 μm)]The results are shown in Table 2.

EXAMPLE 4

Preparation of the cylinder and image formation were practiced in entirely the same manner as in Example 3 except for omitting tin oxide used in the paint for coating of the cylinder surface of Example 3. [coated film thickness 21 μm (including the lower layer of 3 μm)]The results are shown in Table 2.

EXAMPLE 5

The cylinder having the cyclized butadiene rubber layer (3 μm) provided thereon as used in Example 3 was coated with a paint obtained by mixing the following components:

| | |
|---|---|
| UV-ray curable epoxy acrylate paint Unidec 17-824 (produced by Dainippon Ink Chemical Industry; nonvolatiles 75%; butyl acetate solvent) (surface resistance after film formation: $5.0 \times 10^{15}\Omega$) | 100 g |
| Polycarbon monofluoride powder (mean particle size 1.0 μm, volume resistivity $2.0 \times 10^{3}\Omega \cdot cm$; static frictional coefficient 0.02)) | 5 g |
| Fluorine-containing block polymer Modiper F100 (produced by Nippon Yishi K.K.) | 1 g |
| Alumina powder (for improvement of hardness, mean particle size 1 μm) | 5 g |
| Polyvinyl butyral (for improvement of dispersibility of alumina, polycarbon monofluoride) (Ethlec BMI, produced by Sekisui Kagaku) | 3 g |
| Ethyl alcohol | 10 g |
| Butyl acetate | 30 g, |

dried at 80° C. for 10 minutes and then irradiated by a 4 KW condensing type UV-ray lamp at an irradiation distance of 15 cm for one minute to form a coating with a thickness of 11 μm, thus providing a cylinder coated with a film with a thickness of 14 μm as the sum with the cyclized butadiene rubber layer. By use of this cylinder, preparation of the cylinder and image formation were practiced in entirely the same manner as in Example 3. The results are shown in Table 2.

TABLE 2

| | Results of image formation | | | |
|---|---|---|---|---|
| | Example 3 | Example 5 | Comparative example 1 | Example 4 |
| First sheet | Good | Good | Good | Good |
| 100th sheet | Good | Good | Image disturbd (Attachment of developing agent is prominent) | No appreciate attachment of developing agent, but fog due to triboelectric charging slightly occurred when severely evaluated |
| 100,000th sheet | Good | Good | Image disturbed (Flaw and attachment of developing agent are prominent) | |

EXAMPLE 6

A cyclized butadiene rubber paint JSR CBR-M (trade name of Japan Synthetic Rubber K.K., containing 80 wt. % of xylene) was applied on the outer circumferential surface of a cylinder made of an aluminum alloy with an inner diameter of 60 mm, an outer diameter of 100 mm and length of 230 mm, and dried by heating at 180° C. for 60 minutes to obtain a cylinder coated with a film with a thickness of 3 μm.

This cylinder was coated with a paint obtained by mixing the following components:

| | |
|---|---|
| (1) Powder of potash tetrasilicon mica which is synthetic mica [$KMg_{2.5}(Si_4O_{10})F_2$] (volume resistivity $5.0 \times 10^{14}\Omega \cdot cm$; mean particle size 2.5 μm) | 25 g |
| (2) alumina ($Al_2O_3$) powder (volume resistivity $4.0 \times 10^{14}\Omega \cdot cm$; mean particle size 1.0 μm) | 75 g |
| (3) fluorine-containing block copolymer Modiper F200 (produced by Nippon Yushi K.K.) | 5 g |
| (4) UV-curable type epoxy acrylate paint Unidec V5502 (produced by Dainippon Ink Chemical Industry K.K.) (surface resistance after film formation $8.0 \times 10^{15}\Omega$) | 50 g |
| 2-Ethylanthraquinone (photoreaction accelerator) | 1.0 g |
| Methyl ethyl ketone | 40 g |

After drying at 80° C. for 10 minutes, the coating was irradiated by a 4 KW condensing type UV-ray lamp at an irradiation distance of 15 cm for 30 seconds to form a coating with a thickness of 18 μm, thus providing a cylinder coated with a film with a thickness of 21 μm as the sum with the cyclized butadiene rubber layer.

EXAMPLE 7

The same cylinder as used in Example 6 (cyclized butadiene rubber layer 3 μm) was coated with a paint obtained by mixing the following components:

| | |
|---|---|
| (1) Powder of potash tetrasilicon mica which is synthetic mica [$KMg_{2.5}(Si_4O_{10})F_2$] (volume resistivity $5.0 \times 10^{14}\Omega \cdot cm$; mean particle size 2.5 μm) | 5 g |
| (2) alumina ($Al_2O_3$) powder (volume resistivity $4.0 \times 10^{14}\Omega \cdot cm$; mean particle size 1.0 μm) | 95 g |
| (3) polytetrafluoroethylene powder (static frictional coefficient 0.06, mean particle size 0.3 μm) | 10 g |

-continued

| | | |
|---|---|---|
| (4) | fluorine-containing block copolymer Modiper F200 (produced by Nippon Yushi K.K.) | 2 g |
| (5) | UV-curable type urethane acrylate paint (resin content 75%) Unidec 17-824 (produced by Dainippon Ink Chemical Industry K.K.) (surface resistance after film formation $8.2 \times 10^{15}\Omega$) | 60 g |
| | Butyl acetate | 40 g |

After drying at 80° C. for 10 minutes, the coating was irradiated by a 4 KW condensing type UV-ray lamp at an irradiation distance of 15 cm for 30 seconds to form a coating with a thickness of 12 μm, thus providing a cylinder coated with a film with a thickness of 15 μm as the sum with the cyclized butadiene rubber layer.

EXAMPLE 8

According to entirely the same method as in Example 6 except for omitting potash tetrasilicon mica, an electrostatic recording medium was prepared. A cylinder with the final film thickness of 19 μm (including the thickness 3 μm of the cyclized butadiene rubber layer) was obtained.

EXAMPLE 9

According to entirely the same method as in Example 6 except for omitting alumina power and potash tetrasilicon mica used for coating of the surface in Example 6, a cylinder with the final film thickness of 19 μm (including the thickness 3 μm of the cyclized butadiene rubber layer) was obtained.

COMPARATIVE EXAMPLE 7

According to entirely the same method as in Example 6 except for omitting the A-B type fluorine-containing block polymer (Modiper F200) used for coating of the surface in Example 6, an electrostatic recording medium was prepared. A cylinder with the final film thickness of 22 μm (including the thickness 3 μm of the cyclized butadine rubber layer) was obtained.

By use of the respective cylinders for recording obtained in Examples 6, 7 and 9, and Comparative example 7, which were assembled in the electrostatic recording device as described above, successive image formation test and durability test by corona irradiation were conducted.

[Test 1]

For examples 6, 8 and 9, corona irradiation was effected, and the changes in surface state were compared. Corona irradiation time was 600 minutes, and surface resistances were measured under the respective conditions of normal temperature and normal humidity (23° C., 60%) and higher temperature and higher humidity (33° C., 90%). The results are shown in Table 3.

TABLE 3

Change in surface resistance with lapse of time (Unit: Ω)

| | Before corona irradiation | | After corona irradiation | |
|---|---|---|---|---|
| | 23° C. 60% | 33° C. 90% | 23° C. 60% | 33° C. 90% |
| Example 1 | $2.2 \times 10^{15}$ | $4.2 \times 10^{14}$ | $6.7 \times 10^{14}$ | $8.4 \times 10^{13}$ |
| Example 3 | $2.1 \times 10^{15}$ | $4.0 \times 10^{14}$ | $5.1 \times 10^{14}$ | $4.2 \times 10^{13}$ |
| Comparative example 1 | $4.0 \times 10^{15}$ | $3.4 \times 10^{13}$ | $8.1 \times 10^{14}$ | $2.6 \times 10^{11}$ |

As is evident from the above Table, deterioration by corona irradiation was smaller by mixing with inorganic material.

[Test 2]

For Example 7 and Comparative example 7 as described above, successive image formation test was conducted. The test was conducted by means of the electrostatic recording device as described above by forming an electrostatic latent image on the coated film of the recording cylinder, developing the image with a dry system pressure fixable toner, and pressure transferring the toner image onto a transfer paper simultaneously with fixing. The number of successive copying was 100,000 with the use of papers of A4 size. The transfer efficiencies before and after successive copying were compared. The results are shown in Table 4.

TABLE 4

| | Transfer efficiency | |
|---|---|---|
| | Before successive copying | After successive copying |
| Example 2 | 99% | 98% |
| Comparative example 2 | 99% | 90% |

Transfer efficiency was determined by detracting the weight of the transfer paper before transfer of toner image from the weight of the transfer paper after transfer to determine the transferred toner amount a gram, with the residual toner on the recording medium being as b gram, and calculating the value of $a/a+b\times 100$. From the results, it has been found that the effect by mixing with a fluorine-containing block copolymer on the transfer characteristic is great.

We claim:

1. An electrostatic recording device for a transfer system provided with a recording medium having a dielectric layer and an electroconductive substrate, said recording medium having a dielectric layer containing a resin for film formation and a fluorine-containing block copolymer comprising a polymer having a fluorine-containing monomer component block copolymerized at one end of a non-fluorine-containing polymer.

2. An electrostatic recording device according to claim 1, wherein said fluorine-containing block copolymer is contained in said dielectric layer in an amount of 0.1 to 50% by weight.

3. An electrostatic recording device according to claim 1, wherein the resin for film formation to be used as the consituent of said dielectric layer has a surface resistance after film formation of $10^{12}\Omega$ or higher.

4. An electrostatic recording device according to claim 1, wherein the volume resistivity of the resin for film formation is $10^{13}\Omega$.cm or higher.

5. An electrostatic recording device according to claim 1, wherein said dielectric layer contains a resin for film formation having a pencil hardness characteristic of H or more and a volume resistivity of $10^{13}\Omega$.cm or higher and a fluorine-containing block copolymer.

6. An electrostatic recording device according to claim 1, wherein said film for film formation is at least one selected from the group of resins consisting of polyimide, polyamide-imide, polyamide, polyesterimide, polyester, polyvinylformal epoxy resin, polyurethane, melamine resin, acrylic resin, polymethyl methacrylate silicone polyimide resin, silicone resin, polyacrylamideimide, epoxy resin, urethaneacrylate resin and epoxyacrylate resin.

7. An electrostatic recording device according to claim 1, wherein said dielectric layer is provided on the electroconductive substrate or through another dielectric layer.

8. An electrostatic recording device according to claim 1, wherein said fluorine-containing block copolymer is a block copolymer having a polymer having fluorine-containing alkyl group block-copolymerized at one end of a non-fluorine-containing polymer.

9. An electrostatic recording device according to claim 6, wherein said non-fluorine-containing polymer has a vinyl monomer component.

10. An electrostatic recording device according to claim 9, wherein said non-fluorine-containing polymer is a polyalkyl acrylate or a polyalkyl methacrylate.

11. An electrostatic recording device for a pressure transfer system provided with a recording medium having a dielectric layer and an electroconductive substrate, said recording medium having a dielectric layer containing a resin for film formation and a fluoride-containing block copolymer comprising a polymer having a fluorine-containing monomer component block copolymerized at one end of a non-fluorine-containing polymer.

12. An electrostatic recording device according to claim 11, wherein said pressure transfer system is the pressure transfer system simultaneous with fixing.

13. An electrostatic recording device according to claim 11, wherein said dielectric layer contains, together with the fluorine-containing block copolymer, a resin for film formation having a surface resistance after film formation $10^{12}\Omega$ or higher and inorganic fine powder having a volume resistivity less than $10^{10}$ $\Omega$.cm.

14. An electrostatic recording device according to claim 13, wherein said dielectric layer contains 100 parts by weight of the resin for film formation, 0.01 to 300 parts by weight of the fluorine-containing block copolymer and 0.1 to 300 parts by weight of inorganic fine powder.

15. An electrostatic recording device according to claim 11, wherein said dielectric layer contains, together with the fluorine-containing block copolymer, a resin for film formation having a surface resistance after film formation $10^{12}\Omega$ or higher and inorganic powder having a volume resistivity of $10^{10}\Omega$.cm or higher.

16. An electrostatic recording device according to claim 15, wherein said dielectric layer contains 100 parts by weight of inorganic powder, 0.001 to 300 parts by weight of the fluorine-containing block copolymer and 5 to 300 parts by weight of the resin for film formation.

17. An electrostatic recording device according to claim 11, wherein said dielectric layer contains, together with (B) the fluorine-containing block copolymer, (A) inorganic powder having a volume resistivity of $10^{10}\Omega$.cm or higher, (C) inorganic powder having a volume resistivity less than $10^{10}\Omega$.cm, and (D) resin for film formation having a surface resistance after film formation of $10^{12}\Omega$ or higher.

18. An electrostatic recording device according to claim 17, wherein the above mixture comprises 100 parts by weight of the above component (A), 0.001 to 300 parts by weight of the component (B), 0.1 to 100 parts by weight of the component (C) and 5 to 300 parts by weight of the component (D).

19. An electrostatic recording medium, having a dielectric layer containing a resin for film formation and a fluorine-containing block copolymer comprising a polymer having a fluorine-containing monomer component block copolymerized at one end of a non-fluorine-containing polymer.

20. An electrostatic recording medium according to claim 19, wherein said fluorine-containing block copolymer is contained in an amount of 0.1 to 50% by weight in the dielectric layer.

21. An electrostatic recording medium according to claim 19, wherein said fluorine-containing block copolymer is a block copolymer having a polymer having fluorine-containing alkyl group block-copolymerized at one end of a non-fluorine-containing polymer.

* * * * *

UNITED STATES PATENT AND TRADEMARK OFFICE
CERTIFICATE OF CORRECTION

PATENT NO. : 4,745,030

DATED : May 17, 1988

INVENTOR(S) : KOZO ARAHARA, ET AL.

It is certified that error appears in the above-identified patent and that said Letters Patent is hereby corrected as shown below:

COLUMN 1

Line 30, "electro-conductive" should read --electroconductive--.

COLUMN 2

Line 16, "charge" should read --charges--.
Line 66, "above." should read --above:--.

COLUMN 3

Line 32, "OF PREFERRED" should read --OF THE PREFERRED--.
Line 55, "preferably" should read --preferable--.

COLUMN 4

Line 18, "33th Annual" should read --33rd Annual--.

COLUMN 8

Line 30, "(trase" should read --(trade--.

COLUMN 10

Table 1,
"After 100,000 sheets" should read --After 100,000 sheets--.
After 100,100 sheets
Line 45, "a aluminum" should read --an aluminum--.

UNITED STATES PATENT AND TRADEMARK OFFICE

CERTIFICATE OF CORRECTION

PATENT NO. : 4,745,030

DATED : May 17, 1988

INVENTOR(S) : KOZO ARAHARA, ET AL.

It is certified that error appears in the above-identified patent and that said Letters Patent is hereby corrected as shown below:

COLUMN 11

Line 17, "3 μm)]The" should read --3 μm)]. The--.
Line 27, "μm)]The" should read --μm)]. The--.
Line 45, "0.02))" should read --0.02)--.

COLUMN 12

Table 2, "Comparative example 1" should read --Comparative example 6--.
Table 2, "disturbd" should read --disturbed--.
Table 2, "appreciate" should read --appreciable--.

COLUMN 13

Table 3, "Example 1 / Example 3 / Comparative example 1" should read --Example 6 / Example 8 / Example 9--.

COLUMN 14

Table 4, "Example 2 / Comparative example 2" should read --Example 7 / Comparative example 7--.
Line 27, "detracting" should read --subtracting--.
Line 51, "consituent" should read --constituent--.

UNITED STATES PATENT AND TRADEMARK OFFICE

CERTIFICATE OF CORRECTION

PATENT NO. : 4,745,030

DATED : May 17, 1988

INVENTOR(S) : KOZO ARAHARA, ET AL.

It is certified that error appears in the above-identified patent and that said Letters Patent is hereby corrected as shown below:

COLUMN 15

Line 13, "claim 6," should read --claim 8,--.
Line 35, "formation $10^{12}\Omega$" should read --formation of $10^{12}\Omega$--.

COLUMN 16

Line 5, "formation $10^{12}\Omega$" should read --formation of $10^{12}\Omega$--.

Signed and Sealed this

Seventh Day of March, 1989

Attest:

DONALD J. QUIGG

Attesting Officer

Commissioner of Patents and Trademarks